United States Patent [19]

Overmyer et al.

[11] Patent Number: 5,152,641

[45] Date of Patent: Oct. 6, 1992

[54] METHOD AND APPARATUS FOR CONTROLLING GLASS DRILLING

[75] Inventors: Michael S. Overmyer, Millbury; Thomas A. Peitz, Jr., Sylvania, both of Ohio

[73] Assignee: Royal Tool, Inc., Toledo, Ohio

[21] Appl. No.: 776,836

[22] Filed: Oct. 15, 1991

[51] Int. Cl.⁵ .................. B23B 35/00; B23B 41/00
[52] U.S. Cl. .................. 408/1 R; 364/474.17; 408/3; 408/37; 408/59
[58] Field of Search .................. 408/1 R, 3, 10, 17, 408/37, 40, 56, 57, 59; 364/474.02, 474.12, 474.17

[56] References Cited

U.S. PATENT DOCUMENTS

| | | | |
|---|---|---|---|
| 2,413,084 | 12/1946 | Sommer et al. | 408/59 |
| 3,568,367 | 3/1971 | Myers | 408/59 |
| 3,813,820 | 6/1974 | Highberg et al. | |
| 3,827,189 | 8/1974 | Highberg et al. | |
| 3,828,479 | 8/1974 | Highberg et al. | |
| 4,198,180 | 4/1980 | Schultz | 408/10 |
| 4,955,763 | 9/1990 | Delventhal et al. | |
| 5,028,176 | 7/1991 | Delventhal et al. | |

*Primary Examiner*—Daniel W. Howell
*Attorney, Agent, or Firm*—MacMillan, Sobanski & Todd

[57] ABSTRACT

A method and apparatus for controlling glass drilling in which the starting position for the drill bit is calibrated prior to drilling. The drill bit is initially spaced close to the surface to be drilled and the rotating bit is slowly advanced toward the surface while a cooling fluid is discharged through an axial passage through the bit. Contact between the bit and the surface is determined by sensing either an increase in the fluid back pressure or a decrease in the fluid flow rate. The determined bit position is stored and used as a starting position when subsequently drilling holes. The starting position may be modified for subsequent workpieces to compensate for bit wear.

21 Claims, 3 Drawing Sheets

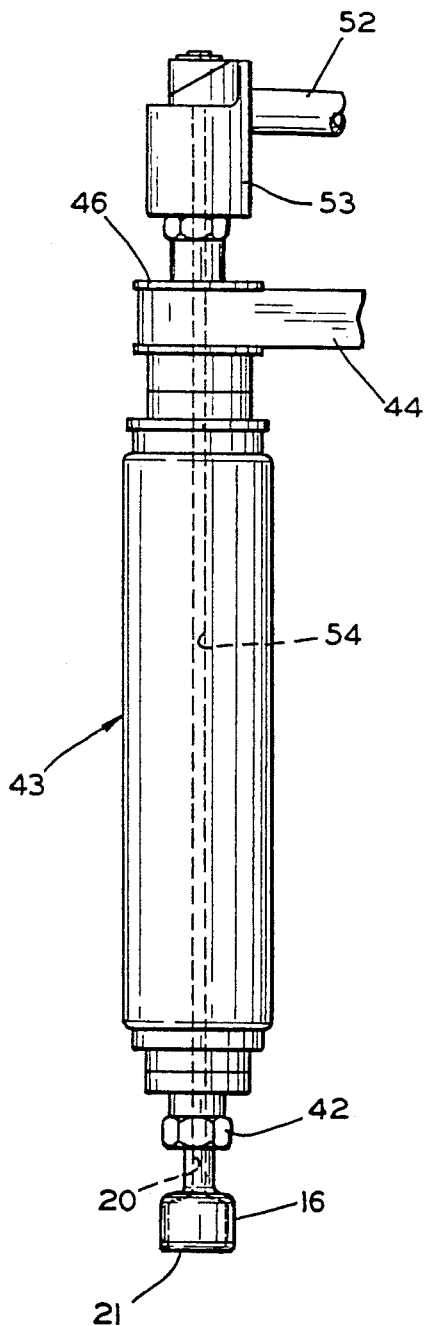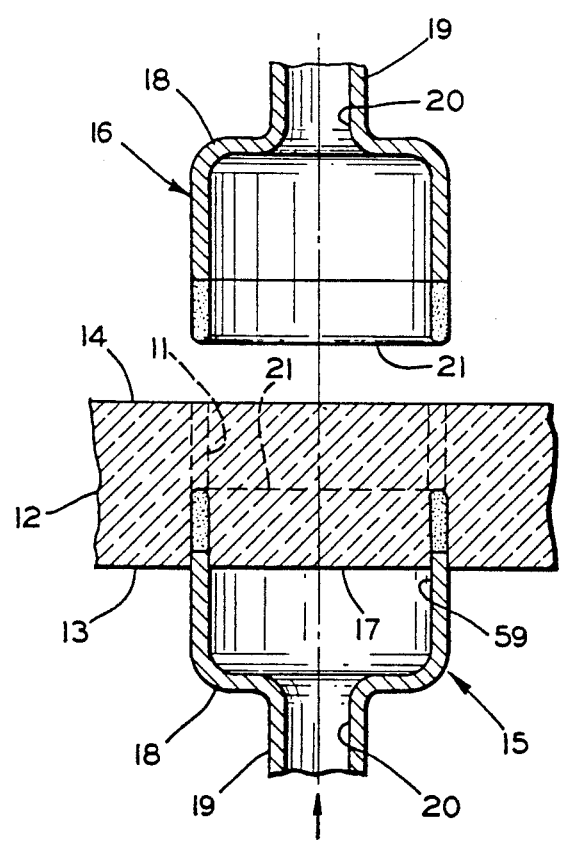
FIG. 3
FIG. 2

METHOD AND APPARATUS FOR CONTROLLING GLASS DRILLING

TECHNICAL FIELD

The invention relates to glass drilling and more particularly to a method and apparatus for controlling the drilling of glass and similar brittle materials in which drill bits are initially advanced to sense the location of opposing surfaces of the glass prior to drilling to calibrate the starting positions for the drills.

BACKGROUND ART

When drilling holes through glass and similar brittle materials, it is common to drill a hole partially through the material from one side and to drill an axially aligned hole from the opposite side of the material until the holes converge. If a hole is drilled through the material from only one side, there is a risk that the material will shatter as the drill bit approaches and emerges from the opposite side. Typically, a first bit is advanced to drill a hole about half way through the material from one side and then a second bit is advanced to drill a substantially coaxial hole from the opposite side until the holes converge. For optimum performance, it is desirable to drill substantially half way through the sheet of material with the first drill and to operate the second drill only until the opposing holes converge. Because of the hardness and the brittleness of the material, the drill bits must be advanced into contact with the material at a very slow rate. If the location of the drill bit tip is not known relative to the location of the surface, the drill bit must be advanced very slowly from some distance from the surface so as not to fracture the material with a sudden impact. The location of the drill bit tip will vary from drill bit to drill bit due to manufacturing tolerance variations and there may be slight variations in the location of the surface of the material. Further, the location of the drill bit tip will change as the bit wears during use.

To facilitate drilling and to prolong the life of the bit, a flow of cooling fluid is delivered to the cutting surface of the drill bit during drilling. If the bit is of adequate diameter, the cooling fluid flows through an axial passage through the bit and discharges between the bit and the adjacent surface being drilled. While the bit is in contact with the material, the cooling fluid delivered to the bit will have a substantially higher back pressure and a lower flow rate than when the bit is spaced from the material. It is known, for example, that the back pressure of the cooling fluid can be used to determine when the bit is drilling through glass. In U.S. Pat. No. 5,028,176, for example, hollow bits are used to drill a hole in glass. After a lower bit drills part way through the glass, an upper bit drills a converging hole. When the hole portion drilled by the upper bit converges with the hole portion drilled by the lower bit and the core falls from the hole, there is a sudden drop in the cooling fluid back pressure. This fluid pressure drop is used to indicate that the hole has been completed and that drilling may be discontinued.

DISCLOSURE OF INVENTION

The invention is directed to a method and apparatus for automatically controlling the drilling of holes through glass and similar brittle materials in which a hole must be drilled partially through the material from one side and the hole is completed by drilling a substantially coaxial hole from an opposite side of the material. Typically, the material is clamped in a horizontal position at a workstation. Prior to drilling holes through the workpiece with newly replaced drill bits, the apparatus is operated through a calibration cycle. Initially, the lower bit is moved to a position close to the surface of the material, for example, about 1/32 inch (or about 0.79 mm) from the estimated surface location of the material. The flow of cooling fluid is turned on and the rotating bit is incrementally advanced slowly towards the surface. As the bit is advanced, either the back pressure on the cooling fluid or the cooling fluid flow rate is monitored. When the bit moves into contact with the material surface, the back pressure will raise sharply and the flow will rapidly decrease. The position of the bit tip when it contacts the material surface is recorded to indicate the starting position for drilling the material from the bottom surface. The process is repeated for a drill bit which is moved into contact with the upper surface of the material. Through this calibration process, the actual locations of the drill bit tips relative to the material surfaces are determined, regardless of tolerance variations in the sizes of the drill bits, in the drilling apparatus, and in the material. The recorded starting positions may be used when drilling a series of identical thickness workpieces.

According to a further aspect of the invention, the controller may be programmed to modify the calibrated starting positions for the drill bits as the bits wear during use. For a given type of drill bit and a given type of material, the amount of wear can be determined either as an average for each hole drilled or as a wear rate per unit time that the bit is in operation. If the wear rate is determined as an average for each hole drilled, the starting points may be modified either for each successive hole drilled or they may be modified after a predetermined number of holes have been drilled to compensate for bit wear. Or, the total drilling time may be measured, for example, by measuring the time that the cooling fluid back pressure is above a predetermined level as a consequence of the working drill bit being in contact with the material. If the wear rate is per unit time, the starting points may be either modified for each successive hole or modified after a predetermined operating time has elapsed. Consequently, when a hole is to be drilled in a workpiece, the bits may be quickly moved to a starting position adjacent the surface of the material and then advanced slowly as the hole is drilled.

Accordingly, it is an object of the invention to provide a method and apparatus for controlling the drilling of glass and similar brittle materials which automatically calibrates the starting point for the drill bits.

Other objects and advantages of the invention will be apparent from the following detailed description and the accompanying drawings.

BRIEF DESCRIPTION OF THE DRAWINGS

FIG. 2 is a fragmentary cross sectional view showing a hole being drilled through a sheet of glass;

FIG. 3 is an enlarged side elevational view of one of the drill bit holding spindle.

BEST MODE FOR CARRYING OUT THE INVENTION

Figure 1:
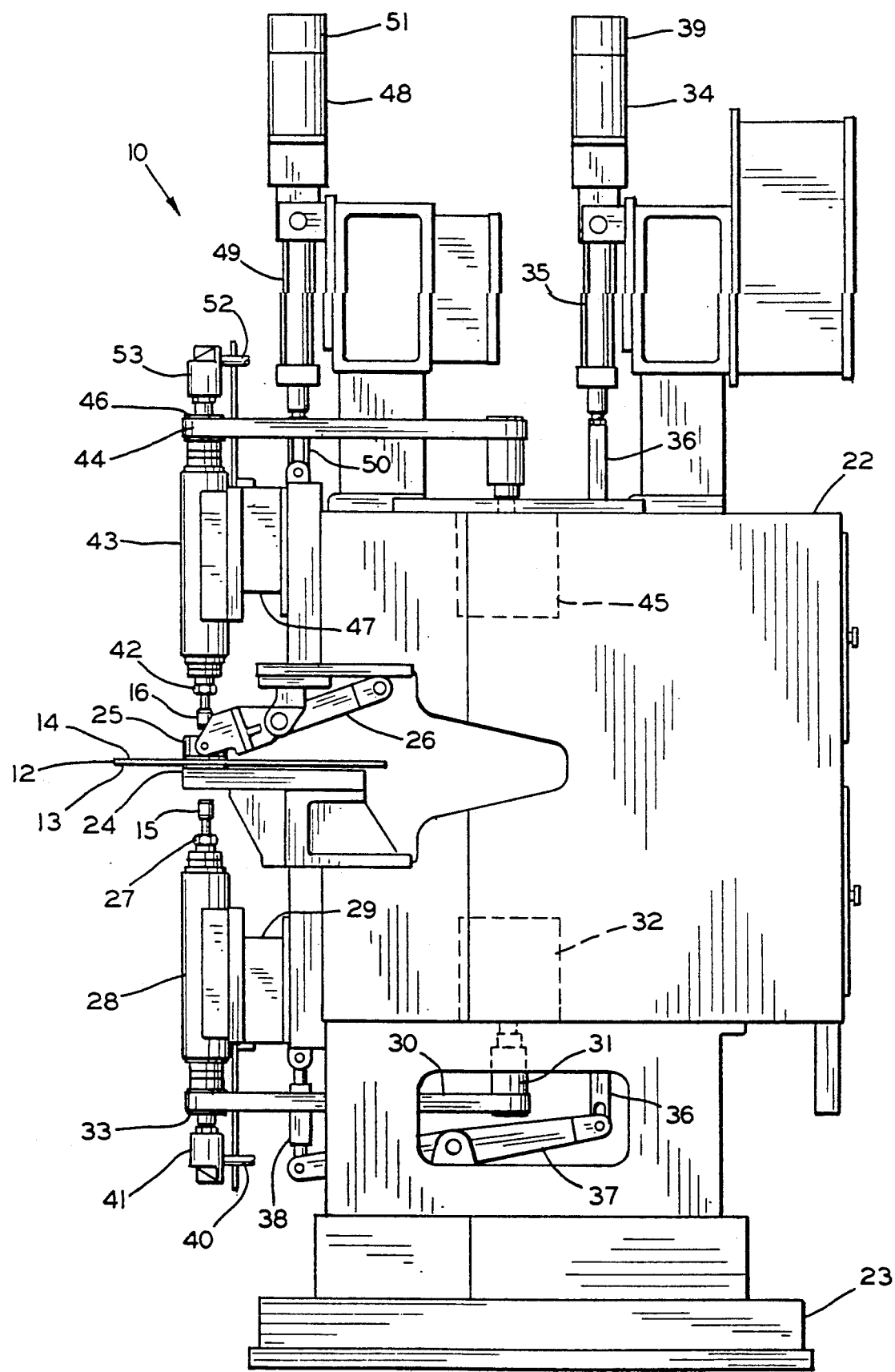
FIG. 1 is a side elevational view of apparatus according to the invention for drilling holes in glass and similar materials.

Referring to FIGS. 1 and 2 of the drawings, apparatus 10 is illustrated for drilling a hole 11 in a sheet of glass 12 and similar brittle materials. In order to prevent fracture of the glass 12, it is necessary to drill the hole 11 partially through the glass 12 from one side, such as from a lower side 13, and then to complete the hole from an opposite side, such as an upper side 14. As shown in FIG. 2, a lower portion of the hole 11 is being drilled by a lower bit 15. An upper bit 16 is positioned in axial alignment with the lower bit 15 for completion of the hole 11 after the lower bit 15 drills part way through the glass 12. Preferably, the lower bit 15 drills from the lower surface 13 substantially half way through the glass 12 and the upper bit 16 then completes the hole 11 by drilling from the upper surface 14 until the hole portions converge. By drilling substantially half way through the glass with each bit, the bits 15 and 16 will have equal wear. The bits 15 and 16 are of a hollow design and a center slug or core 17 is ejected upon completion of the hole 11. Each bit 15 and 16 has a hollow cutting head 18 and a shaft 19. An axial passage 20 extends through the shaft 19 for supplying a coolant to a cutting edge 21 on each bit. The cutting edge 21 is typically formed from a metal matrix containing abrasive particles, for example, of diamond.

FIG. 1 shows details of the drilling apparatus 10. The apparatus 10 includes a housing 22 mounted on a base 23. A table 24 for supporting the sheet of glass 12 is secured to the housing 22. Once the glass 12 is positioned on the table 24, a clamp 25 mounted on a rocker arm 26 is pivoted into engagement with the glass 12 to prevent movement of the glass 12 on the table 24 during drilling.

The lower drill bit 15 is secured by a chuck 27 to a lower spindle 28. The spindle 28 is mounted on a roller slide assembly 29 to move in a linear direction along a path perpendicular to the glass 12 secured to the table 24. A drive belt 30 connects a shaft 31 of a motor 32 to a sheave 33 on the spindle 28 for rotating the bit 15. A motor 34 is connected through a screw feed unit 35 to axially position a linkage 36 which is in turn connected through a rocker arm 37 and a linkage 38 to accurately position the spindle 28. Rotation of the motor 34 moves the bit 15 towards or away from the lower glass surface 13. Preferably the motor 34 is either a stepper motor or a servomotor. A resolver or encoder 39 connected to the motor 34 provides feedback control data on the position of the motor 34 and, hence, data on the position of the spindle 28 relative to the glass surface 13. A suitable source (not shown) of pressurized cooling fluid such as water is connected through a hose 40 and a rotary joint 41 to the spindle 28. An axial passage (not shown) through the spindle 28 connects the rotary joint 41 with the axial passage 20 in the bit 15.

Details for the mounting and operation of the upper bit 16 are shown in FIGS. 1 and 3. A chuck or collet 42 secures the bit 16 to a spindle 43. A drive belt 44 connects a motor 45 to a sheave 46 on the spindle 43 for driving the bit 16. The two drill bit drive motors 32 and 45 may be conventional AC motors. The spindle 43 is mounted on a roller slide assembly 47 for movement along a path perpendicular to the glass 12 secured to the table 24. The spindles 28 and 43 are mounted to move on the same axis with the bits 15 and 16 aligned to rotate on the axis. A motor 48 is connected through a screw feed unit 49 and a linkage 50 for positioning the roller slide assembly 47 and, hence, for positioning the spindle 43 and the attached bit 16. A resolver or encoder 51 provides data on the position of the motor 48 and, hence, data on the position of the spindle 43. Like the motor 34, the motor 48 is preferably a stepper motor or a servomotor. As best seen in FIG. 3, a pressurized cooling fluid hose 52 is connected through a rotary joint 53 to an axial passage 54 through the spindle 43 which connects with the axial passage 20 in the bit 16.

Figure 4:
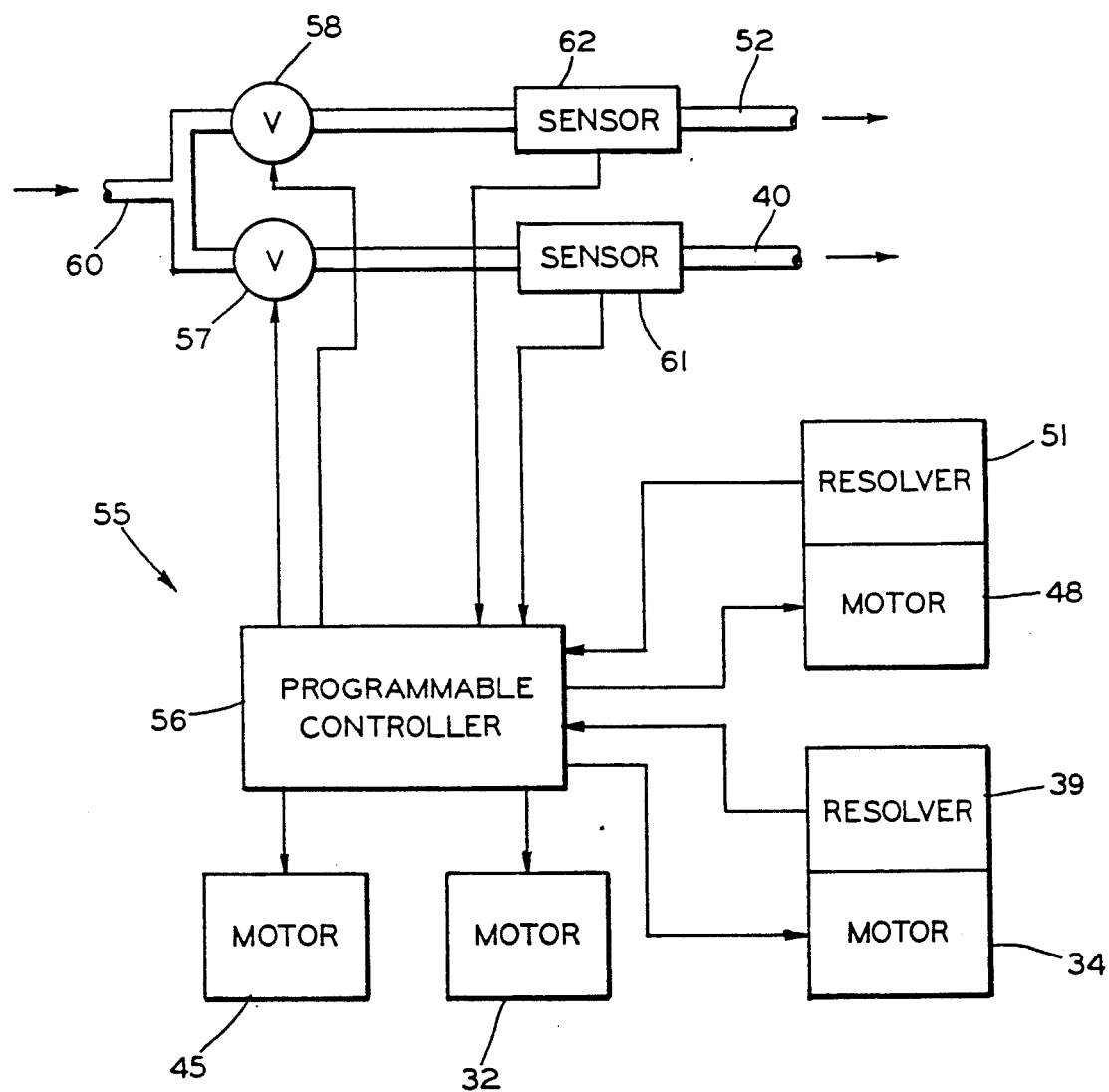
FIG. 4 is a block diagram of a controller for the glass drilling apparatus of FIG. 1.

FIG. 4 illustrates a control circuit 55 for the apparatus 10. A programmable controller 56 is connected to control operation of the drill bit positioning motors 34 and 48, the drill bit drive motors 32 and 45 and the cooling fluid valves 57 and 58. The programmable controller 56 receives position data for the lower spindle 28 from the resolver or encoder 39 attached to the motor 34 and receives position data for the upper spindle 43 from the resolver or encoder 51 attached to the motor 48. A fluid line 60 from a source (not shown) of pressurized cooling fluid is connected in parallel to the two valves 57 and 58. The outlet side of the valve 57 is connected through a sensor 61 and the hose 40 to the lower spindle 28 to supply cooling fluid to the lower bit 15. Similarly, the outlet side of the valve 58 connects through a sensor 62 and the hose 52 to the upper spindle 43 to supply cooling fluid to the upper bit 16. The sensors 61 and 62 either may measure fluid flow through the valves 57 and 58, respectively, or they may measure fluid pressure in the lines 40 and 52, respectively. If the sensors 61 and 62 measure flow, they are connected in series with the hoses 40 and 52, respectively. If they measure pressure, they may be connected through a T fitting to the hoses 40 and 52. The outputs from the sensors 61 and 62 are connected to the programmable controller 56. The programmable controller 56 may be a commercial microcomputer, such as an IBM PC or a single board computer, with suitable input and output buffers for interfacing with the connected motors and sensors.

Because of the brittle nature of the glass 12 or of similar materials being drilled, it is necessary to advance the rotating drill bits 15 and 16 very slowly into contact with the glass surface and to advance the bit very slowly during drilling. If the bit is advanced too fast, either the glass 12 or the matrix cutting edge 21 on the bit will fracture. Because of the slow advancing speed, it is desirable to start drilling with the bit initially moved into contact with or very close to the surface to avoid an unnecessary delay before the bit contacts the glass. Whenever the bits are changed, the starting positions for the spindles 28 and 43 will change due to variations between different bits and due to variations in seating the bits in the chucks 27 and 42. According to the invention, the starting positions for the lower bit 15 and for the upper bit 16 are initially calibrated and these positions are subsequently used so long as similar thickness workpieces are being drilled and the bits are not changes. However, the bit starting positions may be automatically adjusted to compensate for bit wear, as discussed below.

Initially, the starting position for the lower bit 15 is calibrated by moving a sheet of the glass 12 or another workpiece into the workstation on the table 24 and securing the clamp 25. The controller 56 moves the rotating bit 15 to a predetermined position near the lower glass surface 13, for example, about 1/32 inch (about 0.79 mm) from the surface 13. The actual initial position will depend upon how accurately the surface location and the bit position can be estimated to assure that there is no contact between the bit 15 and the glass surface 13. The coolant valve 57 is opened to flow coolant into a cavity 59 in the bit 15 and the coolant overflows the cutting edge 21. The controller 56 monitors the output from the fluid sensor 61 while operating the motor 34 to incrementally advance the bit 15 towards the lower surface 13. The bit 15 may be advanced, for example, in increments of about 0.005 inch (about 0.127 mm) with, for example, a 0.5 second delay between increments to allow the fluid flow/pressure at the sensor 61 to stabilize. At the point that the bit 15 contacts the surface 13, there will be a sudden increase in the fluid back pressure and a corresponding decrease in the fluid flow rate at the sensor 61. In response to the sensed fluid pressure or flow change, the controller 56 will stop the motor 34 and store the output of the resolver or encoder 39 as a measure of the starting position for the bit 15 when drilling a hole. The valve 57 is closed once the starting position is determined.

The estimated location of the lower surface 13 is determined by the location of the table 24, while the estimated location of the upper surface 14 is determined from the location of the table 24 and from the thickness of the glass 12 entered by an operator into the controller 56. The controller 56 now operates the motor 48 to move the upper bit 16 to a position near but spaced from the upper surface 14 and opens the fluid valve 58. The motor 48 is operated to increment the rotating upper bit 16 slowly towards the upper surface 14, with pauses between increments to allow the fluid pressure/flow at the sensor 62 to stabilize. When the upper bit 16 contacts the upper surface 14, the pressure will suddenly increase and the flow rate will decrease. When this change is sensed, the controller 56 stops the motor 48, closes the valve 58 and stores the upper bit starting position as indicated by the resolver 51. This stored position is subsequently used as a starting position for the upper bit 16 when drilling holes, until the bit 16 is replaced or until a different thickness workpiece is to be drilled.

After the starting positions are determined for the lower bit 15 and the upper bit 16, the controller 56 automatically controls the apparatus 10 for drilling holes. Initially, the fluid valve 57 is opened, the bit drive motor 32 is started if it was not already running, the lower bit 15 is moved to its stored starting position, and the motor 34 is slowly advanced to drill a hole substantially half way through the glass 12. The bit 15 is then retracted from the glass 12, the valve 57 is closed and the motor 32 may be stopped. The controller 56 opens the fluid valve 53, starts the bit drive motor 45 if it was not already running, operates the motor 48 to move the upper bit 16 to its stored starting position, and operates the motor 48 to slowly advance the upper bit 16 to drill the remainder of the hole through the glass 12. By accurately knowing the bit starting positions and the thickness of the glass 12, there is minimum delay when starting drilling and the lower bit 15 can be controlled to drill half way through the glass 12 and the upper bit 16 can be controlled to drill just converge with the lower portion of the hole drilled by the lower bit 15.

It is known that the drill bits 15 and 16 will shorten due to wear of the cutting edge 21 during use. If the stored starting positions are used for successively drilling a number of holes in the glass 12, the bit 15 will become increasingly further from the lower surface 13 as its cutting edge 21 wears and the bit 16 will become increasingly further from the upper surface 14 as its cutting edge 21 wears. If an average bit wear rate is determined for each hole drilled, the controller 56 may be programmed to modify the stored starting positions after a predetermined number of holes have been drilled to minimize the delay in starting the drilling of each new hole. Or, the controller 56 can measure the total running time that the bit 15 is used to drill holes by measuring the time that the motor 32 is operating and the sensor 57 simultaneously senses from the fluid pressure or flow that the bit 15 is in contact with the glass 12. The total running time can be multiplied times a wear rate per unit time to determine a starting position modification for compensating for bit wear. A similar calculation may be made for modifying the starting position for the upper bit 16. If each bit 15 and 16 drills half way through the glass 12, the modifications to the two starting points should be the same.

It will be appreciated that various modifications and changes may be made to the above described apparatus 10. For example, a specific type of apparatus 10 has been described. The invention is equally applicable to other types of apparatus for drilling holes in glass and other brittle materials. In the above described apparatus 10, the spindles 28 and 43 which support the bits 15 and 16, respectively, are moved linearly on axially aligned paths. In a modified type of apparatus, the spindles are mounted on arms which pivot so that the bits move on arcuate paths. However, the paths of the lower and upper bits are substantially axial for the short distance that the bits drill through the glass from opposite surfaces. Further, the method and apparatus of the invention may be used to calibrate a starting position when drilling from only one side of the material. It also will be appreciated that although the apparatus 10 was described as holding the glass 12 in a horizontal position during drilling, the glass drilling apparatus may be constructed to hold the glass in any desired position during drilling. Various other modifications and changes will be apparent to those skilled in the art without departing from the spirit and the scope of the following claims.

We claim:

1. Apparatus for successively drilling holes in workpieces at a work station comprising means for positioning a workpiece at the work station, a hollow drill bit having an axial passage, means for rotating said drill bit about said axis, means for moving said drill bit into contact with a workpiece at the work station and for advancing said drill bit as a hole is drilled in such workpiece, means for flowing a fluid through said drill bit passage, said fluid having a first flow property when said bit is spaced from the workpiece and having a second flow property when said bit is in contact with the workpiece, control means including means for determining and storing a starting position for said drill bit in response to a change from said first flow property to said second flow property as said drill bit is moved into contact with a workpiece, said control means controlling said moving means to move said drill bit to said stored starting position prior to drilling each hole.

2. Apparatus for successively drilling holes in workpieces, as set forth in claim 1, and wherein said control means includes means for modifying said stored starting position to compensate for wear of said drill bit.

3. Apparatus for successively drilling holes in workpieces, as set forth in claim 2, wherein said modifying means includes means for counting the number of holes drilled by said drill bit, means for calculating bit wear from the number of holes drilled and an average bit wear rate per hole drilled.

4. Apparatus for successively drilling holes in workpieces, as set forth in claim 2, wherein said modifying means includes means for measuring the total drilling time for said bit, and means for calculating bit wear from such total drilling time and a bit wear rate.

5. Apparatus for successively drilling holes in workpieces, as set forth in claim 4, wherein said means for measuring the total drilling time measures the total time that the fluid has said second property while said bit is rotating.

6. Apparatus for successively drilling holes in workpieces, as set forth in claim 5, wherein said first and second fluid properties are first and second fluid pressures with said second pressure being higher than said first pressure.

7. Apparatus for successively drilling holes in workpieces, as set forth in claim 5, wherein said first and second fluid properties are first and second fluid flow rates with said second flow rate being lower than said first flow rate.

8. In apparatus for drilling a hole through a sheet of material at a work station, said apparatus including first and second opposing bits, means for advancing a first bit to drill a first hole portion substantially along an axis until such first hole portion extends a predetermined distance into such material from a first side and means for advancing a second bit to drill a second hole portion substantially along said axis from a second side of the material until said second hole portion converges with said first hole portion, an improved drill calibration control comprising means for determining and storing a first starting position where said first bit contacts said first side of the material, means for determining and storing a second starting position where said second bit contacts said second side of the material, means for advancing said first drill bit to said stored first starting position prior to drilling said first hole portion, and means for advancing said second drill bit to said stored second starting position prior to drilling said second hole portion.

9. A calibration control for apparatus for drilling a hole through a sheet of material at a work station, as set forth in claim 8, wherein each of said first and second drill bits has an axial passage and said drilling apparatus includes means for selectively flowing fluid through said drill bit passages, such fluid flowing between each drill bit and the adjacent material while such drill bit is drilling such material, and wherein said means for determining said first starting position includes means for advancing said first bit into contact with said first surface, means for sensing a property change in fluid delivered to said first bit as said first bit is advanced into contact with said first surface and for determining the location of said first bit in response to such property change, and wherein said means for determining said second starting position includes means for advancing said second bit into contact with said second surface, means for sensing the property change in fluid delivered to said second bit as said second bit is advance into contact with said second surface and for determining the location o said second bit in response to such property change.

10. A calibration control for apparatus for drilling a hole through a sheet of material at a work station, as set forth in claim 9, wherein the sensed fluid property change is an increase in the fluid pressure.

11. A calibration control for apparatus for drilling a hole through a sheet of material at a work station, as set forth in claim 9, wherein the sensed fluid property change is a decrease in the fluid flow rate.

12. A calibration control for apparatus for drilling a hole through a sheet of material at a work station, as set forth in claim 9, wherein said first bit advancing means incrementally advances said first bit into contact with said first surface and said second bit advancing means incrementally advances said second bit into contact with said second surface.

13. A method for calibrating the starting position of a drill bit in apparatus for drilling holes in glass comprising the steps of:
 a) advancing said drill bit into contact with a surface of the glass;
 b) simultaneously flowing fluid through an axial passage in said drill bit;
 c) sensing a change in a property of the fluid flowing through said drill bit when said drill bit contacts said glass surface;
 d) storing the position of said drill bit in response to the sensed fluid property change; and
 e) advancing said drill bit to the stored position prior to drilling a hole.

14. A method for calibrating the starting position of a drill bit in apparatus for drilling holes in glass, as set forth in claim 13, wherein an increase in the fluid pressure is sensed when said drill bit contacts said glass surface.

15. A method for calibrating the starting position of a drill bit in apparatus for drilling holes in glass, as set forth in claim 13, wherein a decrease in the fluid flow rate is sensed when said drill bit contacts said glass surface.

16. A method for calibrating the starting position of a drill bit in apparatus for drilling holes in glass, as set forth in claim 13, wherein said drill bit is advanced into contact with said glass surface in predetermined small increments with a predetermined delay between successive increments.

17. A method for calibrating the starting position of a drill bit in apparatus for drilling holes in glass, as set forth in claim 16, and further including the step of initially advancing said drill bit to a predetermined position spaced from said glass surface prior to incrementally advancing said drill bit into contact with said glass surface.

18. A method for calibrating the starting position of a drill bit in apparatus for drilling holes in glass, as set forth in claim 13, and further including the step of modifying the stored starting position to compensate for drill bit wear.

19. A method for calibrating the starting position of a drill bit in apparatus for drilling holes in glass, as set forth in claim 18, wherein said starting position is modified by a wear factor determined from the number of holes drilled with said bit and an average wear rate per hole.

20. A method for calibrating the starting position of a drill bit in apparatus for drilling holes in glass, as set forth in claim 18, wherein said starting position is modified by a wear factor determined from the total drilling time for said bit and a rate of wear per unit time.

21. A method for calibrating the starting position of a drill bit in apparatus for drilling holes in glass, as set forth in claim 13, wherein said drill bit is rotated as it is advanced into contact with a surface of the glass.

* * * * *